(12) United States Patent
Saarisalo (10) Patent No.: US 9,398,137 B2
(45) Date of Patent: Jul. 19, 2016

(54) METHOD, DEVICE AND SYSTEM FOR CONTROLLING APPLICATION LAUNCHING IN A MOBILE TERMINAL DEVICE

(75) Inventor: Mikko Saarisalo, Kantvik (FI)

(73) Assignee: Nokia Technologies Oy, Espoo (FI)

( * ) Notice: Subject to any disclaimer, the term of this patent is extended or adjusted under 35 U.S.C. 154(b) by 1966 days.

(21) Appl. No.: 11/912,057

(22) PCT Filed: Apr. 19, 2005

(86) PCT No.: PCT/IB2005/001032
§ 371 (c)(1),
(2), (4) Date: Jan. 23, 2008

(87) PCT Pub. No.: WO2006/111782
PCT Pub. Date: Oct. 26, 2006

(65) Prior Publication Data
US 2008/0207128 A1    Aug. 28, 2008

(51) Int. Cl.
*H04B 7/00* (2006.01)
*H04M 1/725* (2006.01)
*G06F 9/445* (2006.01)
*H04W 4/00* (2009.01)

(52) U.S. Cl.
CPC ............. *H04M 1/7253* (2013.01); *G06F 9/445* (2013.01); *H04W 4/00* (2013.01)

(58) Field of Classification Search
USPC ........................................................ 455/41.2
See application file for complete search history.

(56) References Cited

U.S. PATENT DOCUMENTS

| | | |
|---|---|---|
| 6,177,860 B1 | 1/2001 | Cromer et al. |
| 6,400,272 B1 | 6/2002 | Holtzman et al. |
| 6,629,635 B1 | 10/2003 | Akamine |
| 2001/0007815 A1* | 7/2001 | Philipsson ...................... 455/41 |
| 2004/0002305 A1* | 1/2004 | Byman-Kivivuori et al. ............................ 455/41.2 |

(Continued)

FOREIGN PATENT DOCUMENTS

| | | |
|---|---|---|
| EP | 0986020 | 3/2000 |
| EP | 1207459 | 5/2002 |

(Continued)

OTHER PUBLICATIONS

S. Pruitt; Nokia Launches mobile RFID kit; IDG News Service; Published: 00:00, Mar. 19, 2004.

(Continued)

*Primary Examiner* — Zhiyu Lu
(74) *Attorney, Agent, or Firm* — Locke Lord LLP (57) ABSTRACT

The present invention generally discloses methods, devices and systems for controlling application launching by means of a dedicated application launching table. According to a first aspect of the present invention a method for controlling launching of an application in a first mobile terminal device is provided. Said first mobile device comprises a first near field communication (NFC) module. The method according to the present invention comprises the steps of maintaining a dedicated application launching table, detecting the presence of a second device adapted to communicate with said first terminal device, determining identification parameters relating to said second device, and launching at least one predetermined application in said first device, wherein said application is selected to be launched based on entries in said dedicated application launching table and on said determined identification parameters.

38 Claims, 5 Drawing Sheets

(56) References Cited

U.S. PATENT DOCUMENTS

| | | |
|---|---|---|
| 2004/0003024 A1 | 1/2004 | Sairanen et al. |
| 2004/0077313 A1* | 4/2004 | Oba et al. .................. 455/41.2 |
| 2004/0122774 A1 | 6/2004 | Studd et al. |
| 2004/0203768 A1 | 10/2004 | Ylitalo et al. |
| 2004/0203944 A1 | 10/2004 | Huomo et al. |
| 2004/0259499 A1* | 12/2004 | Oba et al. .................. 455/41.2 |
| 2005/0040250 A1 | 2/2005 | Wruck |
| 2005/0058108 A1 | 3/2005 | Ekberg et al. |
| 2005/0059379 A1 | 3/2005 | Sovio et al. |
| 2005/0138630 A1 | 6/2005 | Reynolds |
| 2006/0044153 A1* | 3/2006 | Dawidowsky ........... 340/825.22 |
| 2006/0058018 A1* | 3/2006 | Toulis et al. ............... 455/422.1 |
| 2006/0293069 A1* | 12/2006 | Patel et al. .................. 455/466 |
| 2007/0082652 A1* | 4/2007 | Hartigan et al. ............ 455/404.2 |
| 2007/0155443 A1* | 7/2007 | Cheon et al. ................ 455/572 |
| 2007/0178882 A1* | 8/2007 | Teunissen et al. ........... 455/411 |
| 2008/0174405 A1* | 7/2008 | Toorn ......................... 340/10.1 |

FOREIGN PATENT DOCUMENTS

| | | |
|---|---|---|
| EP | 1521201 | 6/2005 |
| EP | 1630712 | 1/2006 |
| EP | 1633104 | 8/2006 |
| WO | WO0137004 | 5/2001 |
| WO | WO0150224 | 7/2001 |
| WO | 0215075 A1 | 2/2002 |
| WO | WO0215601 | 2/2002 |
| WO | WO2004003801 | 1/2004 |
| WO | WO2004004372 | 1/2004 |
| WO | WO2005060167 | 6/2005 |

OTHER PUBLICATIONS

T. Pratt; Library of Congress Cataloging in Publication Data, Department of Computer Sciences, Computation Center, University of Texas at Austin; Bibliography, Programming Languages (Electronic computers), I. Title, QA76.7.P7 001.6 424 74-16114, ISBN 0-13-730432-3; Design and Implementation; Heap Storage Management: Variable-Size Elements "Recovery with Variable-Size Blocks"; p. 265, 1975 by Prentice-Hall, Inc. Englewood Cliffs, NJ.

D. Brock; The Electronic Product Code (EPC) "A Naming Scheme for Physical Objects"; White Paper, Auto-ID Center MIT-AUTOID-WH-002, 2001 Copyright; pp. 5-21, published Jan. 1, 2001.

http://www.hpl.hp.com/techreports/2001/HPL-2001-279.pdf—T. Kindberg, et al.; "People, Places, Things: Web Presence for the Real World"; Internet and Mobile Systems Laboratory, HP Laboratories Palo Alto, HPL-2001-279, Oct. 31, 2001; Mobile Networks & Applications Journal, early 2002, Copyright Kluwer Academic Publishers.

* cited by examiner

| NTIP Type | Mifare UL | 1k | 4k | ISO 14443-4 | NFC P2P |
|---|---|---|---|---|---|
| "St" | "Service Discovery" | "Service Discovery" | "Service Discovery" | "Service Discovery" | |
| ".com.vendor.appl" | "Certain Application" | | | | |
| ".com.buzz.game" | "Certain Application" | | | | "Buzz Game" |
| <ntip type> | | | | | |
| ".com.vendor.esg" | | | | | "Configure Video Recorder" |
| ".com.vendor.remote control configuration" | | | | | "Configure Video Recorder" |
| ".com. vendor.esg" | | | | | "Configure Video Recorder" |
| <ntip type> | | | | | |
| ".com.rmv.ticket" | | | | "BussTicketAppl" | |
| <ntip type> | | | | | |
| <ntip type> | | | | | |
| <ntip type> | | | | | |
| Other | "FieldForceAppl" | | | | "WebServer" |

METHOD, DEVICE AND SYSTEM FOR CONTROLLING APPLICATION LAUNCHING IN A MOBILE TERMINAL DEVICE

The present invention relates to the field of control of application launching in a mobile terminal device, wherein said mobile terminal may further be equipped with a smartcard module and a near field communication (NFC) interface.

In one possible embodiment of the NFC, electromagnetic and/or electrostatic coupling is implemented in the radio frequency (RF) portion of the electromagnetic spectrum, using for example radio frequency identification (RFID) technology, which primarily includes radio frequency identification (RFID) transponders also denoted as radio frequency (RFID) tags and radio frequency transponder readers also denoted for simplicity as radio frequency (RFID) readers. Radio frequency identification (RFID) transponders are widely used for labeling objects, to establish person's identities and to recognize objects provided with radio frequency identification (RFID) transponders. Basically, radio frequency identification (RFID) transponders include an electronic circuit with data storage capacity and a radio frequency (RF) interface and high frequency (HF) interface, respectively, which couples an antenna to the electronic circuit.

The radio frequency identification (RFID) transponders are typically accommodated in small containers. Depending on the requirements made on the deployment of the radio frequency identification (RFID) transponders (i.e. the data transmission rate, energy of the interrogation, transmission range etc.) different types are provided for data provision and transmission on different radio frequencies, for example within a range from several 10-100 kHz to some GHz, respectively, (e.g. 134 kHz, 13,56 MHz, 860-928 MHz etc; only for illustration).

In combination with the above-mentioned technology the usage of smartcards is steadily growing. Modern smartcards provide application developer with a secure and tamperproof environment for developing high value, secure and complex applications. Said smartcards include a central processing unit as well as secure memory areas making unwanted access by third parties very difficult. Further, cryptographic means are provided within the smartcard, which opens the deployment of smartcards for secure applications like banking or even personal identification applications.

Modern mobile terminal devices like mobile phones for instance are equipped with a NFC communication module, for instance and with a secure and tamperproof smartcard module as well. It is desired that applications relating to the NFC module and/or the secure smartcard module are controlled so that unwanted or fraudulent are avoided. Actual embodiments and methods for controlling mobile terminal devices are only using the information from the corresponding RFID-tag or another imaginable tag type in combination with the detected application type.

An overall object of the present invention is to provide a method for controlling application launching in a mobile terminal device based on detected data type relating to a specific tag without including application specific information. Further, a mobile terminal device adapted for controlling application launching and a system are provided. The present invention discloses an efficient method for NFC-based application selection/triggering, and more particularly a dedicated Launch Table, which allows terminal applications to "register and sign" onto the Launch Table for providing necessary association for triggering said applications upon an event of communication with tags or outside sources respectively registered for said applications over the NFC communication interface.

The objects of the present invention are solved by the subject matter defined in the accompanying independent claims.

According to a first aspect of the present invention a method for controlling launching of an application in a first mobile terminal device is provided. Said first mobile device comprises a first near field communication (NFC) module. The method according to the present invention comprises the steps of: maintaining a dedicated application launching table, detecting the presence of a second device adapted to communicate with said first terminal device, determining identification parameters relating to said second device, and launching at least one predetermined application in said first device, wherein said application is selected to be launched based on entries in said dedicated application launching table and on said determined identification parameters. However the first device is able to communicate with the second device by means of a near field communication interface like the NFC-standard interface for instance.

Another data communication channels is contemplated for a skilled person and resides within the scope of the present invention. Said communication may be processed unidirectional and/or bidirectional and may be adapted for proper working. The identification parameters are received from the second device and may comprise the NTIP field as standardized by the NFC-forum or a application identifier (AID) or the like. The second device may be a RFID-tag or a P2P device which may control said first device, for instance in a gaming application or the like. Said dedicated application launching table may be adapted for different implementations by a skilled person.

According to a first embodiment of the present invention, the method additionally comprises a step of providing an interface adapted to allow applications to perform entries within said dedicated application launching table based on at least a combination of said determined identification parameters, dedicated record type information and additional information. Thereby, it is possible to allow a full control over said dedicated application launching table by a user for instance but automatically updating or remote updating are also imaginable.

According to another embodiment of the present invention, said identification parameters comprise information about a data type within said second device. According to the present invention it is now possible to launch a certain application according to a data type within a RFID tag representing said second device.

According to another embodiment of the present invention, said identification parameters comprise information about the physical type of said second device. Thereby adaptation for different physical second devices may be provided. This means different second device types are supported.

According to another embodiment of the present invention, said detecting is provided by means of said NFC-module of said first mobile terminal device.

According to another embodiment of the present invention, said determining is based on received information from said second device. Thus, controlling of said first device may be performed based on information from said second device.

According to another embodiment of the present invention, a determining if said application requires interacting with a secure smartcard module embodied in said mobile terminal device for communicating with said second device on the basis of said dedicated table entries is provided and in case of an affirmative determination passing control of NFC-module to said secure smartcard module to communicate with said second device by connecting said NFC-module with said secure smartcard module. Consequently it is now possible to provide tamperproof data transmissions by means of said smartcard module or element.

Further, determining whether interaction with a secure smartcard module is required may be based on the currently active or running application respectively. According to an alternative implementation it may be based on an external communication source, for instance. Said external communication source may correspond to said second device. However, according to the present invention controlling of interaction with said smartcard module based on a active application is provided. For example, if a certain application is detected as a running application said secure smartcard module will not be activated, for instance. It should be noted that different implementations are imaginable within the scope of the present invention.

According to another embodiment of the present invention, said using operation comprises connecting said NFC-module with said secure smartcard module. Thereby a direct link between the NFC-module and said secure smartcard element is established and fraudulent attacks via the device CPU are avoided. Said smartcard module may be implemented as a tamperproof module.

According to another embodiment of the present invention, a data transaction between said first mobile terminal device and said second device based on an NFC communication interface may be started, wherein said data transaction is provided by said secure smartcard module without user control and/or automatic control by means of said first mobile terminal device.

According to another embodiment of the present invention, said launching is based on received environmental data like temperature, air pressure, humidity or the like. According to this embodiment it is possible to control the first mobile device based on sensed data. That is for instance if the sensed temperature falls below a predefined value another application may be launched. It is also contemplated that said second device will provide the environmental data, and correspondingly said first mobile device may use it for browsing said dedicated application launching table.

According to another aspect of the present invention, a computer program product is provided, which comprises program code sections stored on a machine-readable medium for carrying out the operations of the method according to any aforementioned embodiment of the invention, when the computer program product is run on a processor-based device, a computer, a terminal, a network device, a mobile terminal, or a mobile communication enabled terminal.

According to another aspect of the present invention, a computer program product is provided, comprising program code sections stored on a machine-readable medium for carrying out the operations of the aforementioned method according to an embodiment of the present invention, when the computer program product is run on a processor-based device, a computer, a terminal, a network device, a mobile terminal, or a mobile communication enabled terminal.

According to another aspect of the present invention, a software tool is provided. The software tool comprises program portions for carrying out the operations of the aforementioned methods when the software tool is implemented in a computer program and/or executed.

According to another aspect of the present invention, a computer data signal embodied in a carrier wave and representing instructions is provided which when executed by a processor causes the operations of the method according to an aforementioned embodiment of the invention to be carried out.

According to another aspect of the present invention a mobile terminal device adapted for controlling launching of an application is provided. Said mobile terminal device comprises means for maintaining a dedicated application launching table, a first near field communication (NFC) module, means for detecting the presence of a second device adapted to communicate with said mobile terminal device, means for determining identification parameters relating to said second device and means for launching at least one predetermined application in said mobile terminal device, wherein said application is selected to be launched based on entries in said dedicated application launching table and on said determined identification parameters.

According to another embodiment of the present invention, said mobile terminal device further comprises a secure smartcard module and means for determining if said application requires interacting with said secure smartcard module embodied in said mobile terminal device for communicating with a second device on the basis of dedicated table entries.

According to another embodiment of the present invention, a system comprising a plurality of said first mobile terminal devices according and a plurality of said second devices adapted to communicate with said plurality of mobile terminal devices.

According to another embodiment of the present invention, said at least one second device comprises an RFID transponder. Accordingly, data communications on a RFID-channel is enabled.

According to another embodiment of the present invention, the RFID transponder comprises a passive RFID tag capable of collecting energy from received communication signals and using said collected energy for responding to said received communication signals.

According to another embodiment of the present invention, said at least one second device comprises a point-of sales (PoS) terminal capable of communicating using a second NFC-module.

According to another embodiment of the present invention, said at least one second device comprises a second mobile terminal capable of communicating using a second NFC-module.

The foregoing and other aspects of various embodiments of the present invention will be apparent through examination of the following detailed description thereof in conjunction with the accompanying drawings, in which FIG. 1 schematically illustrates an example block diagram for a portable CE device embodied exemplarily on the basis of a cellular terminal device.

In the following description of the various embodiments, reference is made to the accompanying drawings which form a part thereof, and in which is shown by way of illustration various embodiments in which the invention may be practiced. It is to be understood that other embodiments may be utilized and structural and functional modifications may be made without departing from the scope of the invention. Wherever possible same reference numbers are used throughout drawings and description to refer to similar or like parts.

Figure 1:
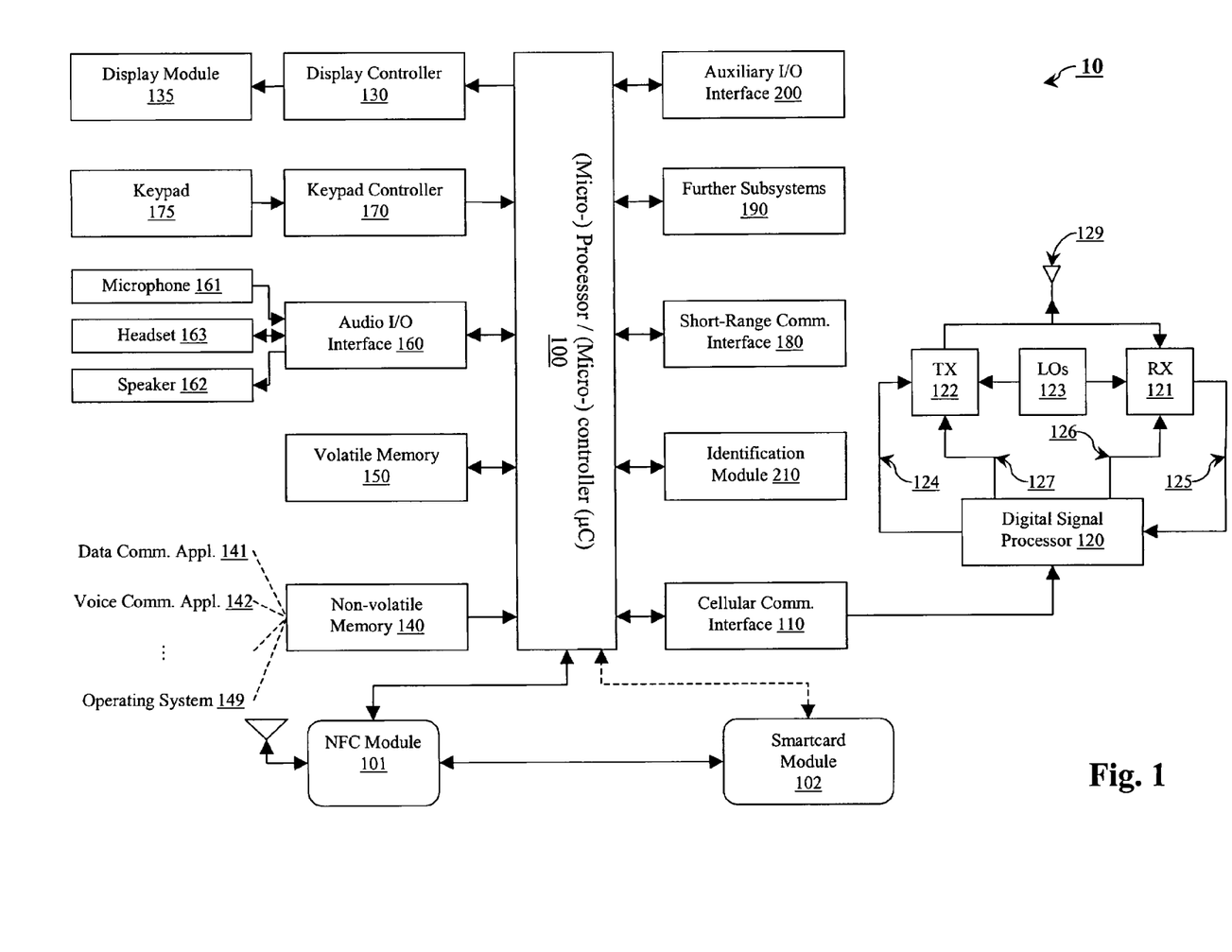

FIG. 1 depicts a typical mobile device according to an embodiment of the present invention. The mobile device 10 shown in FIG. 1 is capable for cellular data and voice communications. It should be noted that the present invention is not limited to this specific embodiment, which represents for the way of illustration one embodiment out of a multiplicity of embodiments. The mobile device 10 includes a (main) microprocessor or microcontroller 100 as well as components associated with the microprocessor controlling the operation of the mobile device. These components include a display controller 130 connecting to a display module 135, a non-volatile memory 140, a volatile memory 150 such as a random access memory (RAM), an audio input/output (I/O) interface 160 connecting to a microphone 161, a speaker 162 and/or a headset 163, a keypad controller 170 connected to a keypad 175 or keyboard, any auxiliary input/output (I/O) interface 200, and a short-range communications interface 180. Such a device also typically includes other device subsystems shown generally at 190.

The mobile device 10 may communicate over a voice network and/or may likewise communicate over a data network, such as any public land mobile networks (PLMNs) in form of e.g. digital cellular networks, especially GSM (global system for mobile communication) or UMTS (universal mobile telecommunications system). Typically the voice and/or data communication is operated via an air interface, i.e. a cellular communication interface subsystem in cooperation with further components (see above) to a base station (BS) or node B (not shown) being part of a radio access network (RAN) of the infrastructure of the cellular network. The cellular communication interface subsystem as depicted illustratively with reference to FIG. 1 comprises the cellular interface 110, a digital signal processor (DSP) 120, a receiver (RX) 121, a transmitter (TX) 122, and one or more local oscillators (LOs) 123 and enables the communication with one or more public land mobile networks (PLMNs). The digital signal processor (DSP) 120 sends communication signals 124 to the transmitter (TX) 122 and receives communication signals 125 from the receiver (RX) 121. In addition to processing communication signals, the digital signal processor 120 also provides for receiver control signals 126 and transmitter control signal 127. For example, besides the modulation and demodulation of the signals to be transmitted and signals received, respectively, the gain levels applied to communication signals in the receiver (RX) 121 and transmitter (TX) 122 may be adaptively controlled through automatic gain control algorithms implemented in the digital signal processor (DSP) 120.

Other transceiver control algorithms could also be implemented in the digital signal processor (DSP) 120 in order to provide more sophisticated control of the transceiver 122. In case the mobile device 10 communications through the PLMN occur at a single frequency or a closely-spaced set of frequencies, then a single local oscillator (LO) 128 may be used in conjunction with the transmitter (TX) 122 and receiver (RX) 121. Alternatively, if different frequencies are utilized for voice/data communications or transmission versus reception, then a plurality of local oscillators 128 can be used to generate a plurality of corresponding frequencies. Although the antenna 129 depicted in FIG. 1 or a diversity antenna system (not shown), the mobile device 10 could be used with a single antenna structure for signal reception as well as transmission. Information, which includes both voice and data information, is communicated to and from the cellular interface 110 via a data link between the digital signal processor (DSP) 120. The detailed design of the cellular interface 110, such as frequency band, component selection, power level, etc., will be dependent upon the wireless network in which the mobile device 100 is intended to operate.

After any required network registration or activation procedures, which may involves the subscriber identification module (SIM) 210 required for registration in cellular networks, have been completed, the mobile device 10 may then send and receive communication signals, including both voice and data signals, over the wireless network. Signals received by the antenna 129 from the wireless network are routed to the receiver 121, which provides for such operations as signal amplification, frequency down conversion, filtering, channel selection, and analog to digital conversion. Analog to digital conversion of a received signal allows more complex communication functions, such as digital demodulation and decoding, to be performed using the digital signal processor (DSP) 120. In a similar manner, signals to be transmitted to the network are processed, including modulation and encoding, for example, by the digital signal processor (DSP) 120 and are then provided to the transmitter 122 for digital to analog conversion, frequency up conversion, filtering, amplification, and transmission to the wireless network via the antenna 129.

The microprocessor/microcontroller (μC) 100, which may also designated as a device platform microprocessor, manages the functions of the mobile device 10. Operating system software 149 used by the processor 100 is preferably stored in a persistent store such as the non-volatile memory 140, which may be implemented, for example, as a Flash memory, battery backed-up RAM, any other non-volatile storage technology, or any combination thereof. In addition to the operating system 149, which controls low-level functions as well as (graphical) basic user interface functions of the mobile device 10, the non-volatile memory 140 includes a plurality of high-level software application programs or modules, such as a voice communication software application 142, a data communication software application 141, an organizer module (not shown), or any other type of software module (not shown). These modules are executed by the processor 100 and provide a high-level interface between a user of the mobile device 10 and the mobile device 10. This interface typically includes a graphical component provided through the display 135 controlled by a display controller 130 and input/output components provided through a keypad 175 connected via a keypad controller 170 to the processor 100, an auxiliary input/output (I/O) interface 200, and/or a short-range (SR) communication interface 180.

The auxiliary I/O interface 200 comprise especially USB (universal serial bus) interface, serial interface, MMC (multimedia card) interface and related interface technologies/standards, and any other standardized or proprietary data communication bus technology, whereas the short-range communication interface radio frequency (RF) low-power interface including especially WLAN (wireless local area network) and Bluetooth communication technology or an IRDA (infrared data access) interface. The RF low-power interface technology referred to herein should especially be understood to include any IEEE 801.xx standard technology, which description is obtainable from the Institute of Electrical and Electronics Engineers. Moreover, the auxiliary VO interface 200 as well as the short-range communication interface 180 may each represent one or more interfaces supporting one or more input/output interface technologies and communication interface technologies, respectively. The operating system, specific device software applications or modules, or parts thereof, may be temporarily loaded into a volatile store 150 such as a random access memory (typically implemented on the basis of DRAM (direct random access memory) technology for faster operation.

Moreover, received communication signals may also be temporarily stored to volatile memory 150, before permanently writing them to a file system located in the non-volatile memory 140 or any mass storage preferably detachably connected via the auxiliary I/O interface for storing data. It should be understood that the components described above represent typical components of a traditional mobile device 10 embodied herein in form of a cellular phone. The present invention is not limited to these specific components and their implementation depicted merely for the way for illustration and sake of completeness.

An exemplary software application module of the mobile device 10 is a personal information manager application providing PDA functionality including typically a contact manager, calendar, a task manager, and the like. Such a personal information manager is executed by the processor 100, may have access to the components of the mobile device 10, and may interact with other software application modules. For instance, interaction with the voice communication software application allows for managing phone calls, voice mails, etc., and interaction with the data communication software application enables for managing SMS (soft message service), MMS (multimedia service), e-mail communications and other data transmissions. The non-volatile memory 140 preferably provides a file system to facilitate permanent storage of data items on the device including particularly calendar entries, contacts etc. The ability for data communication with networks, e.g. via the cellular interface, the short-range communication interface, or the auxiliary I/O interface enables upload, download, synchronization via such networks.

The application modules 141 to 149 represent device functions or software applications that are configured to be executed by the processor 100. In most known mobile devices, a single processor manages and controls the overall operation of the mobile device as well as all device functions and software applications. Such a concept is applicable for today's mobile devices.

A typical processing device comprise of a number of integrated circuits that perform different tasks. These integrated circuits may include especially microprocessor, memory, universal asynchronous receiver-transmitters (UARTs), serial/parallel ports, direct memory access (DMA) controllers, and the like. A universal asynchronous receiver-transmitter (UART) translates between parallel bits of data and serial bits. The recent improvements in semiconductor technology caused that very-large-scale integration (VLSI) integrated circuits enable a significant grow in complexity, making it possible to integrate numerous components of a system in a single chip. With reference to FIG. 1, one or more components thereof, e.g. the controllers 130 and 160, the memory components 150 and 140, and one or more of the interfaces 200, 180 and 110, can be integrated together with the processor 100 in a signal chip.

According to further embodiments of the present invention, said device 10 may comprise two microprocessors. The first one may operate the operational or conventional logic respectively and the other one may operate the NFC interface 101 and the secure smartcard module 102. It is also contemplated that the NFC logic including said additional processor for controlling may be implemented as a functional cover providing a NFC communication interface. Further, according to the present invention it is imaginable that said smartcard module 102 and said SIM card module 210 are the same, which means that both modules are jointed.

According to the present invention said mobile device 10 embodies a NFC module 101 and a smartcard module 102. These modules may interconnect with each other and can be further controlled by said mobile device controller 100. It is imaginable that the smartcard module includes a CPU or the like, so that interacting with the mobile device CPU 100 may be avoided. Such behavior may be desired for sensitive application wherein all data transaction and processing are to be executed in a tamperproof environment. Thus, said NFC module 101 may direct all received data directly to the smartcard module 102 without contacting said mobile device CPU 100 and/or noticing the user of said mobile device 10. According to an embodiment of the present invention the dedicated launching table is stored in a memory module 140 of said device 10 and the CPU 100 or the smartcard module CPU are able to receive information relating said dedicated table.

Figure 2:
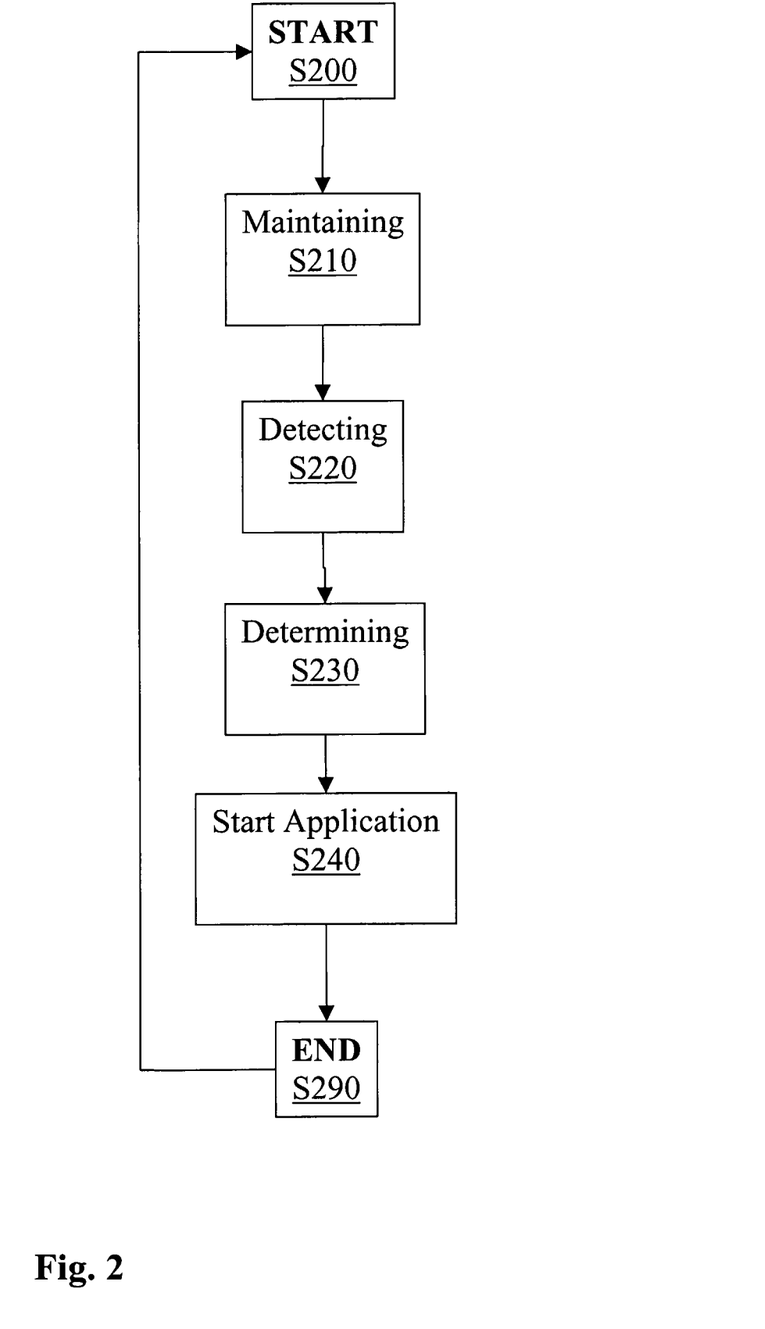
FIG. 2 schematically illustrates a operational sequence of the controlling method in accordance with the present invention.

FIG. 2 illustrates an operational sequence of a method in accordance with the present invention. In an operation S200 the operational sequence may start. Said starting operation S200 may be caused by user input or by other events. Said event may correspond to an exceeding of a previously defined threshold, or the like. It is also imaginable that said event complies with a value which is below a threshold. For instance, if said device 10 is equipped with a temperature sensor and the temperature is above 25 degrees a sensor event will be detected. However, according to similar events said operational sequence may be started which is obvious for a skilled person.

Within said mobile device 10 said CPU 100 will maintain a dedicated application launching table, as illustrated by an operation S210, with reference to FIG. 2. In a next operation S220 detecting of a second device will be provided. Said second device is adapted to communicate with said first device 10 on the basis of a unidirectional or a bidirectional communication link. Thus, it is imaginable that both devices will start a P2P communication including bidirectional data transmissions.

In a next operation S230 determining of certain parameters relating to the second device is provided. Said identification parameters or certain parameters may correspond to the data type or record type which is included in the second device. Said data type may further be used to decide which application should be launched. If the second device corresponds to a RFID tag, the information within the tag comprises a NTIP type. Thus, the data architecture within said tag is now known and may be used for controlling operations of said mobile device 10 in accordance with the present invention.

Thereby said received information from said second device may correspond to the NTIP type of said second device and may be further used as criteria for searching in the dedicated launching table.

In a next operational step S240 a certain application may be started or launched. However, according to received information from said second device which is used to browse said dedicated table. If at least one match was found the corresponding application may be launched and the operational sequence comes to an end operation S290. If, for instance, another second device is detected the operational sequence may be restarted corresponding to a new iteration symbolized by the directed connection between the END S290 operation and the starting operation S200.

Summarizing, when an application is initiated by the terminal at the first time, it may comprise some predefined rules for registering into certain cells in the dedicated launching table. Further, when the terminal encounters new tag types etc. suitable applications may be registered to the table so the launching table may be continuously updated after the initial settings.

The following use case may use for example an AID (application identifier) defined in ISO 7816-5 standard that is received from a second device for deciding which kind of, and which application should be started. This means that the AID may be used for browsing said dedicated table. In this example use case the second device correspond to a point of sales terminal PoS for instance but is not restricted thereto. First, the first mobile terminal is brought close to a PoS terminal and the PoS terminal attempts to select an application in the secure smartcard module for instance.

The 1st mobile device is now able to process a ISO 14443-3 and/or ISO 7816 communication up to the point where the PoS sends a select command. The select command contains an application identifier AID. In this embodiment it is imaginable that these applications are stored and executed in secure smartcard. This information may be included in said dedicated table, according to the present invention. After identifying which application is in question the secure smartcard module may now be activated to communicate with the PoS. Even deactivating of said module is imaginable. Typically this kind of application would be a user interface to query the content of the smartcard or a user interface used to play a brand sound and/or to show a brand logo.

Figure 3:
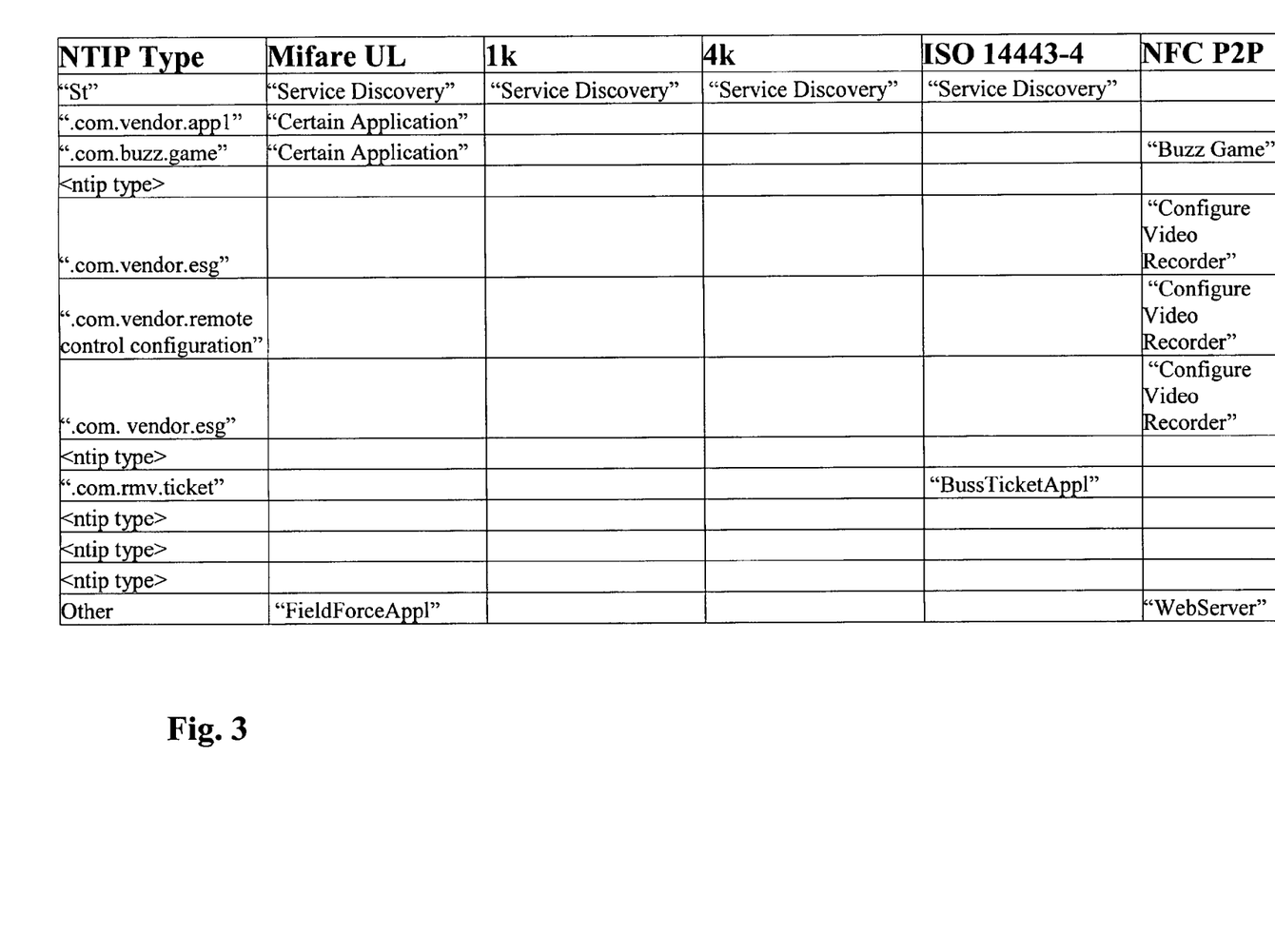
FIG. 3 shows a dedicated application launching table according to an embodiment of the present invention.

FIG. 3 illustrates one possible exemplary embodiment of a dedicated application launching table in accordance with the present invention. The table consist at least two dimensions (two-dimensional chart), wherein the dimensions may be defined as: "NTIP type" and "Tag Type".

The "NTIP type" may represent the type of one or more tag records (data records stored in the memory of a tag for instance) in the tag. In other words, the NTIP type is intended to indicate to the tag reading device of what kind of data is included in the tag. According to this information, the tag reading device can decide whether the data of the tag is from interests (whether to read the whole data record or just discard the tag based on the NTIP type information.) However, according to embodiments of the present invention, that information could be used as one parameter for triggering/launching application initiation.

The second element within the table may be the "Tag Type", which represents the physical type of the tag. I.e What kind of tag is involved (Mifare Ultralight, Mifare 1k, Mifare 4k, or e.g. ISO 14443-4 tag), or whether there is another NFC-device as a counterpart device. Generally, different tag types require different readers, but the NFC devices are substantially capable of communicating with various tag types, thus according to embodiments of the present invention, the tag type can be used as additional parameter in selecting a correct application for launching. As an example, a Mifare ultralight tag having NTIP type of "other" might require launching different application than Mifare 4k tag having NTIP type of "other".

However, as additional dimension, some ambient sensing could be included in the application launching. For example, when an RFID tag is read on temperature under +5 degrees and over 25 degrees, the application to be launched may be different (under +5 degrees the application could be a "normal" operation of a temperature sensing application to be sent to central server, wherein the over +25 degrees might involve an alert application to be launched.)

Further, it should be noticed that a single cell in the Launch table could be related to two or even more applications and that there could be other additional parameters included, such as for example, adding a delay to the application launching.

Figure 4:
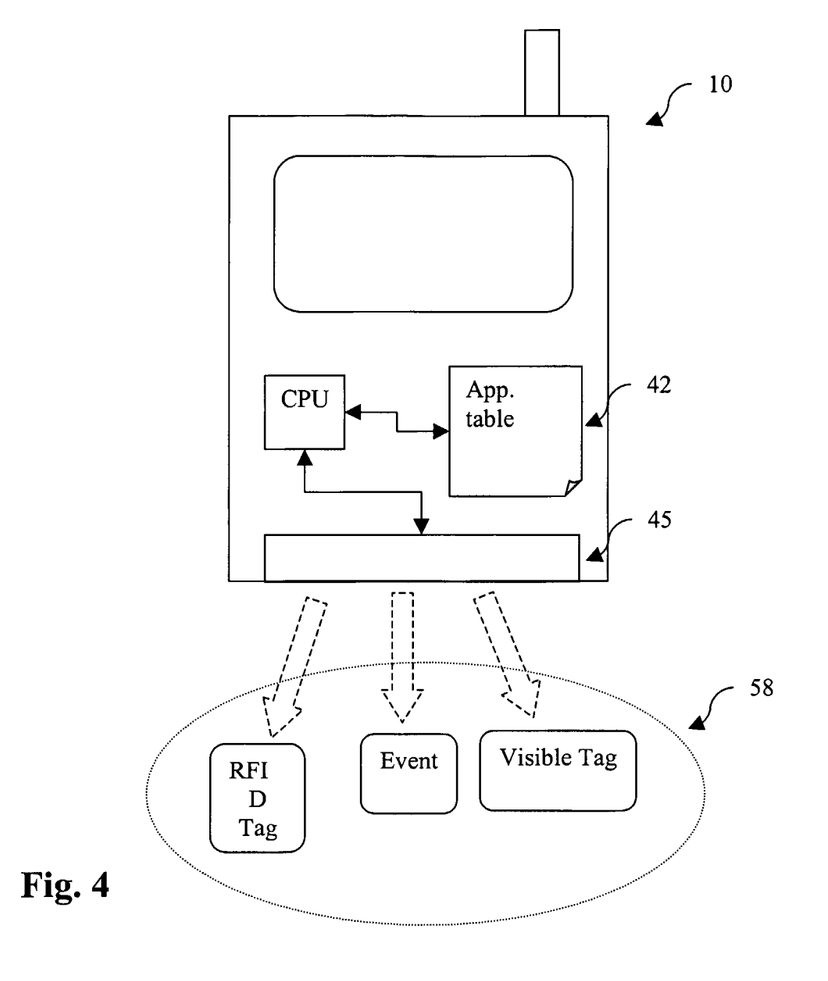
FIG. 4 schematically illustrates interacting of a mobile device with some example external devices and/or events in accordance with the present invention.

FIG. 4 schematically illustrates interacting of a mobile device with some example external devices and/or events in accordance with the present invention. The mobile terminal device may be adapted to detect a plurality of events and/or devices by means of a near field communication module 45. Said module 45 summarizes for instance a sensor, a NFC-module or the like. Said sensor may be a camera or a microphone or another optical instrument or the like.

Within the device said dedicated application launching table 42 may be maintained by means of the mobile device CPU 100 but other implementations are also imaginable. Thus, according to data received from an external group of entities 58, browsing of said application table 42 may be provided by the CPU. According to embodiments of the present invention, the external group of entities may comprise active and passive RFID tags, point-of sale terminals (PoS), such as, for example vending machines for either issuing various electronic tickets, or reading the issued electronic tickets, or other mobile devices equipped with NFC communication interface. It should noted that also other types of devices area imaginable.

Further, manual controlling and maintaining of said application table 42 is also possible. Thereby, a user may configure the dedicated application launching table when he will receive said mobile device 10 for the first time. Even, automatically updating of said table 42 may be provided within the scope of the present invention.

Figure 5:
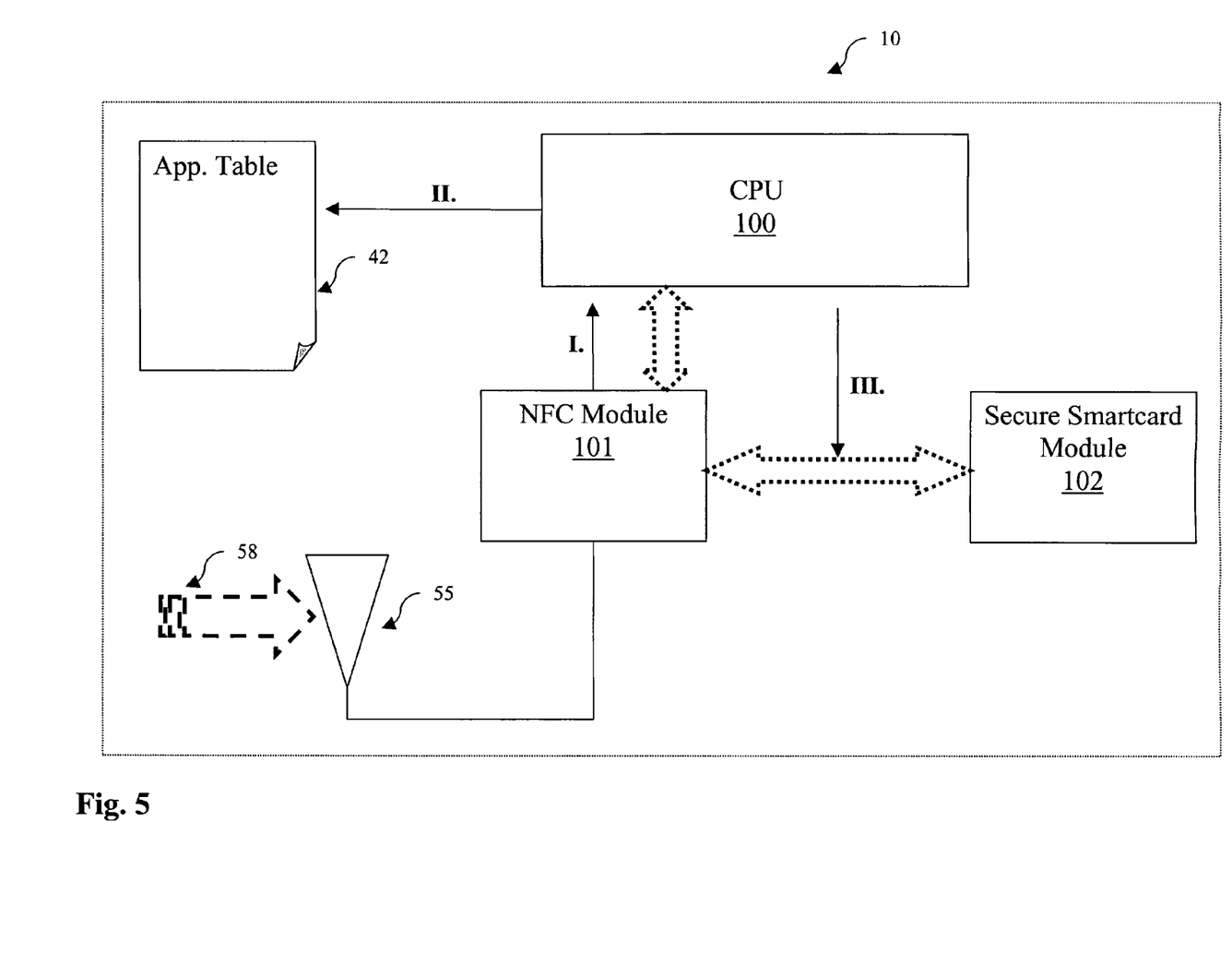
FIG. 5 is an example embodiment of the present invention including a secure smartcard module and a NFC module to be controlled.

Further embodiments of the present invention allows more direct binding between a secure smart card element of the terminal device and active applications (that are launched based on detecting an event corresponding to the triggering of the application based on the application table 42) which is shown in FIG. 5 with respect to another embodiment of the present invention.

In this embodiment the mobile device 10 may be adapted to provide data communications or transactions on a P2P basis. All data 58 coming from a second device will be directed by means of the NFC module 101, via a antenna 55, either to the mobile device CPU 100 or directly to the secure smartcard module 102.

It is also possible that both modules CPU 100 and smartcard module 102 will receive the data 58. A skilled person is able to implement different architectures of data communications within the scope of the present invention.

Generally, upon detecting the presence of an external RF Source, a corresponding application is launched based on the detected tag information using the dedicated application table 42. After launching suitable application, the terminal controller may consult access rights for the information requested by the outside source. If the information relates to secure smart card element but there are some access rights provided to the controller (some secure applications does not allow any visibility even to the terminal controller as the information may be too sensitive even to the user of the terminal (e.g. transaction/credit card specifics/details]) the controller may act to operate during the initial steps of the transaction to gather basic information regarding the transaction.

When the external source requires sensitive information, the communication is passed to the secure smart card element 102, which carries on the actual transaction, but now, the controller 100 have some information regarding the actual transaction and can query for information relating to the conducted transaction. (As an example, when a bus-ticket is bought, the controller could involved in the initial stages of the transaction and when sensitive information is requested, the transaction is passed to the secure smart card element and after the transaction is conducted [a bus ticket is written on the secure smart card element 102], the terminal controller can use the available information (bus-ticket transaction & transaction successful) to provide some indication to the user that a bus-ticket has been purchased.

FIG. 5 symbolizes the abovementioned steps with reference to the numerals I, II and III. This means that in the first step I the NFC module 101 will deliver the received information to the CPU 100 and the CPU will decide on the basis of said received information 58 which application should be launched. The linking between information and certain application is defined in the dedicated application launching table 42. In a next step III the CPU may start an application on said device 10 or according to the table entries the CPU 10 will quit the connection to the NFC module and also to the secure smartcard module so that a tamperproof data processing within the smartcard module 102 is processed.

Several features and aspects of the present invention have been illustrated and described in detail with reference to particular embodiments by the way of example only, and not by the way of limitation. Those skilled in the art will appreciate that alternative implementations and various modifications to the disclosed embodiments are within the scope and contemplation of the invention. Therefore, it is intended that the invention be considered as limited only by the scope of the appended claims.

The invention claimed is:

1. A method, comprising:
maintaining a dedicated application launching table for launching an application in a device having a near field communication module, wherein said dedicated launching table comprises an interface configured to allow applications residing in said device to register within said dedicated application launching table;
receiving at least one of near field communication record type or tag type parameters from an external entity via the near field communication module; and
launching at least one application in said device, wherein said application is selected to be launched based on entries in said dedicated application launching table and on said received at least one of near field communication record type or tag type parameters.

2. The method of claim 1, further comprising:
said interface to allow applications to perform entries within said dedicated application launching table based on at least a combination of said at least near field communication record type or tag type parameters and additional information.

3. The method of claim 1, wherein said near field communication record type parameters comprise information about a record type within said external entity.

4. The method of claim 1, wherein said tag type parameters comprise information about a physical type of said external entity.

5. The method of claim 1, wherein said receiving is provided by means of said near field communication module of said device.

6. The method of claim 1, wherein said receiving is based on received information from said external entity.

7. The method of claim 1, further comprising:
determining if said application requires interacting with a secure smartcard module embodied in said device configured to communicate with said external entity on the basis of said table entries; and
passing control of the near field communication module to said secure smartcard module in case of an affirmative determination, to communicate with said second external entity by connecting said near field communication module with said secure smartcard module.

8. The method of claim 7, further comprising:
starting a data transaction between said device and said external entity based on a near field communication interface provided by said secure smartcard module without user input by means of said first device.

9. The method of claim 1, wherein said launching is based on received environmental data taken from the group consisting of temperature, air pressure, and humidity.

10. A computer program product comprising computer executable program code recorded on a computer readable, non-transitory storage medium, the computer executable program code, when executed by a computer processor, comprising:
program code in said computer readable medium for maintaining a dedicated application launching table for launching applications in a device having a near field communication module, wherein said dedicated launching table comprises an interface configured to allow applications residing in said device to register within said dedicated application launching table;
program code in said computer readable medium for receiving at least one of near field communication, record type or tag type parameters from an external entity via the near field communication module; and
program code in said computer readable medium for launching at least one application in said device, wherein said application is selected to be launched based on entries in said dedicated application launching table and on said received at least near field communication record type or tag type parameters.

11. An apparatus, comprising:
at least one processor;
at least one memory including computer program code;
the at least one memory and the computer program code configured to, with the at least one processor, cause the apparatus at least to:
maintaining a dedicated application launching table for launching an application in the apparatus having a near field communication module, wherein said dedicated launching table comprises an interface configured to allow applications residing in the apparatus to register within said dedicated application launching table;
receive at least one of near field communication record type or tag type parameters from an external entity via the near field communication module; and
launch at least one application in the apparatus, wherein said application is selected to be launched based on entries in said dedicated application launching table and on said received at least near field communication record type or tag type parameters.

12. An apparatus, comprising:
a processor configured to maintain a dedicated application launching table for launching applications in in the apparatus having a near field communication module, wherein said dedicated launching table comprises an interface configured to allow applications residing in said apparatus to register within said dedicated application launching table;
a near field communication module coupled to said processor, configured to receive at least one of near field communication record type or tag type parameters from an external entity via the near field communication module; and
said processor further configured to launch at least one application in the apparatus, wherein said application is selected to be launched based on entries in said dedicated application launching table and on said received at least one of near field communication record type or tag type parameters.

13. The apparatus of claim 12, further comprising:
a secure smartcard module coupled to said processor in said apparatus;
said processor configured to determine if said application requires interacting with said secure smartcard module for communicating with the external entity on the basis of dedicated entries in said application launching table.

14. The apparatus of claim 12, further comprising:
a memory coupled to said processor configured to store said dedicated application launching table;
said processor configured to enable applications to perform entries within said dedicated application launching table based on at least a combination of said at least near field communication record type or tag type parameters and dedicated information in said table.

15. An apparatus, comprising:
means for maintaining a dedicated application launching table for launching applications in the apparatus having a near field communication module, wherein said dedicated launching table comprises an interface configured to allow applications residing in the apparatus to register within said dedicated application launching table;
means for receiving at least one of near field communication record type or tag type parameters from an external entity via the near field communication module; and
means for launching at least one application in the apparatus, wherein said application is selected to be launched based on entries in said dedicated application launching table and on said received at least one of near field communication record type or tag type parameters.

16. A system, comprising:
a first device configured to maintain a dedicated application launching table for launching applications in a device having a near field communication module, wherein said dedicated launching table comprises an interface configured to allow applications residing in said first device to register within said dedicated application launching table;
a second device adapted to communicate with said first device;
a near field communication module in said first device, configured to receive at least one of near field communication record type or tag type parameters from said second device via the near field communication module; and
said first device configured to launch at least one application in said first device, wherein said application is selected to be launched based on entries in said dedicated application launching table and on said received at least one of near field communication record type or tag type parameters.

17. The system of claim 16, wherein the external entity comprises a radio frequency identification transponder.

18. The system of claim 17, wherein the radio frequency identification transponder comprises a passive radio frequency identification tag capable of collecting energy from received communication signals and using said collected energy for responding to said received communication signals.

19. The system of claim 16, wherein the external entity comprises a point-of sale terminal capable of communicating using a second near field communication module.

20. The system of claim 16, wherein the external entity comprises a second near field communication module.

21. The method of claim 1, wherein said external entity is one of an active RFID tag, a passive RFID tag, a point-of sale terminal, a vending machine for issuing electronic tickets, a vending machine for reading the issued electronic tickets, or another mobile device equipped with a near field communication interface.

22. The apparatus of claim 12, wherein said external entity is one of an active RFID tag, a passive RFID tag, a point-of sale terminal, a vending machine for issuing electronic tickets, a vending machine for reading the issued electronic tickets, or another mobile device equipped with a near field communication interface.

23. The system of claim 16, wherein the second device is one of an active RFID tag, a passive RFID tag, a point-of sale terminal, a vending machine for issuing electronic tickets, a vending machine for reading the issued electronic tickets, or another mobile device equipped with a near field communication interface.

24. The method of claim 1, wherein said near field communication parameters include NTIP of transport format type parameters.

25. The computer program product of claim 10, wherein said near field communication parameters include NTIP or transport format type parameters.

26. The apparatus of claim 11, wherein said near field communication parameters include NTIP or transport format type parameters.

27. The apparatus of claim 12, wherein said near field communication parameters include NTIP or transport format type parameters.

28. The apparatus of claim 15, wherein said near field communication parameters include NTIP or transport format type parameters.

29. The method of claim 1, wherein the interface allows applications to register within said dedicated application launching table when initiated by the terminal at a first time.

30. The method of claim 29, wherein the interface allows applications to register within said dedicated application launching table dynamically after initial setting.

31. The computer program product of claim 10, wherein the interface allows applications to register within said dedicated application launching table when initiated by the terminal at a first time.

32. The computer program product of claim 31, wherein the interface allows applications to register within said dedicated application launching table dynamically after initial setting.

33. Apparatus of claim 11, wherein the interface allows applications to register within said dedicated application launching table when initiated by the terminal at a first time.

34. Apparatus of claim 33, wherein the interface allows applications to register within said dedicated application launching table dynamically after initial setting.

35. Apparatus of claim 12, wherein the interface allows applications to register within said dedicated application launching table when initiated by the terminal at a first time.

36. Apparatus of claim 35, wherein the interface allows applications to register within said dedicated application launching table dynamically after initial setting.

37. Apparatus of claim 15, wherein the interface allows applications to register within said dedicated application launching table when initiated by the terminal at a first time.

38. Apparatus of claim 37, wherein the interface allows applications to register within said dedicated application launching table dynamically after initial setting.

\* \* \* \* \*